United States Patent
Huang

(10) Patent No.: US 9,667,412 B2
(45) Date of Patent: May 30, 2017

(54) KEY, SYSTEM AND METHOD OF UNLOCKING ELECTRONIC DEVICE USING THE KEY

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Zhao Huang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 112 days.

(21) Appl. No.: 14/690,129

(22) Filed: Apr. 17, 2015

(65) Prior Publication Data

US 2016/0105278 A1    Apr. 14, 2016

(30) Foreign Application Priority Data

Oct. 14, 2014    (CN) .......................... 2014 1 0539499

(51) Int. Cl.
*H04L 9/08*    (2006.01)
*G06F 21/35*    (2013.01)

(52) U.S. Cl.
CPC ............ *H04L 9/0816* (2013.01); *G06F 21/35* (2013.01); *H04L 2209/24* (2013.01)

(58) Field of Classification Search
CPC .... G06F 21/35; H04L 2209/24; H04L 9/0816
USPC ........................................................ 713/182
See application file for complete search history.

(56) References Cited

U.S. PATENT DOCUMENTS

| | | | | |
|---|---|---|---|---|
| 2007/0229221 | A1* | 10/2007 | Saotome | G07C 9/00111 340/5.64 |
| 2014/0002391 | A1* | 1/2014 | Lu | G06F 3/041 345/173 |
| 2014/0068751 | A1* | 3/2014 | Last | G06F 21/35 726/16 |
| 2015/0078137 | A1* | 3/2015 | Lee et al. | G07C 9/00071 367/198 |

* cited by examiner

*Primary Examiner* — Baotran N To
(74) *Attorney, Agent, or Firm* — Steven Reiss

(57) ABSTRACT

A method for unlocking a display screen of an electronic device includes activating the display screen which is locked of the electronic device when receiving a communication signal from a key, and generating an unlocked icon on the display screen. A request is sent to the key for generating first audio information after the unlocked icon is pressed, and the first audio information of an unlock code is received from the key. When the first audio information is the same as second audio information generated by a decryption algorithm stored in the storage device of the electronic device, the display screen of the electronic device is unlocked.

4 Claims, 4 Drawing Sheets

|   | A    | B   | C   | D   | E    | F   |
|---|------|-----|-----|-----|------|-----|
| 1 | 543  | 2   | 56  | 87  | 91   | 27  |
| 2 | 53   | 24  | 652 | 84  | 53   | 134 |
| 3 | 78   | 362 | 22  | 253 | 1145 | 285 |
| 4 | 23   | 3   | 254 | 784 | 120  | 985 |
| 5 | 25   | 552 | 564 | 654 | 5    | 758 |
| 6 | 15   | 8   | 6   | 444 | 911  | 643 |
| 7 | 56   | 97  | 275 | 823 | 211  | 45  |
| 8 | 4535 | 13  | 361 | 75  | 65   | 9   |

FIG. 3

KEY, SYSTEM AND METHOD OF UNLOCKING ELECTRONIC DEVICE USING THE KEY

CROSS-REFERENCE TO RELATED APPLICATIONS

This application claims priority to Chinese Patent Application No. 201410539499.3 filed on Oct. 14, 2014, the contents of which are incorporated by reference herein.

FIELD

The subject matter herein generally relates to electronic device unlocking technology, and particularly to a key, system and method of unlocking an electronic device using the key.

BACKGROUND

A display screen of an electronic device (for example, a computer or a mobile phone) may be locked for data security when the electronic device is in a sleep mode. Usually, a user can enter a valid password to unlock the electronic device. The password can include letters, characters, alphanumeric characters, written characters, and symbols.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 3 is a diagrammatic view of one embodiment of a decryption algorithm.

DETAILED DESCRIPTION

Figure 1:
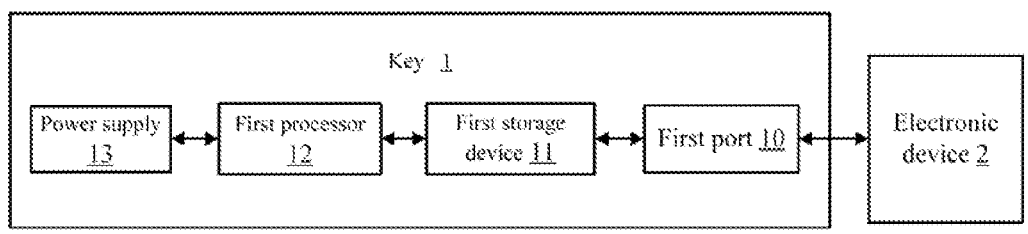
FIG. 1 is a block diagram of an example embodiment of a key.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

FIG. 1 is a block diagram of an example embodiment of a key. In at least one embodiment, the key 1 includes components, such as, a first port 10, a first storage device 11, a first processor 12, and a power supply 13. The components 10-13 communicate with each other through system management bus (SMBus). It may be understood that, FIG. 1 is only one example of the key 1, and other examples can include more or fewer components than those shown in the embodiment, or have a different configuration of the various components.

In at least one embodiment, the first port 10 can be a communication (COM) port, a Universal Serial Bus (USB) port, or a microphone connector, enabling the key 1 to connect to an electronic device 2. In at least one embodiment, the key 1 can also include a wireless communication module (not shown), such as a BLUETOOTH module, a Wi-Fi module, which provide functions of wireless data communication with the electronic device 2.

In at least one embodiment, the first storage device 11 can include an internal storage system, such as a flash memory, a random access memory (RAM) for temporary storage of information, and/or a read-only memory (ROM) for permanent storage of information. The first storage device 11 can also include an external storage system, such as an external hard disk, a storage card, or a data storage medium. In some embodiments, the first storage device 11 stores a plurality of parameters and programs of the key 1.

In at least one embodiment, a decryption algorithm may be pre-stored in the storage device 11. The decryption algorithm can include a matrix, for example, a two-dimensional matrix. Each element in the matrix includes a random number. The decryption algorithm can be used to generate a first audio information to unlock the electronic device 2.

In one embodiment, the first processor 12 of the key 1 can generate an unlock code by randomly selecting one or more elements in the matrix, and generate the first audio information based on musical notes corresponding to the unlock code. For example, as shown in FIG. 3, the first processor 12 can randomly select three elements "A3" "D8" and "F4" in the matrix. Element "A3" includes a number 78, element "D8" includes a number 75, and element "F4" includes a number 985, thus, an unlock code "7875985" can be generated. In one embodiment, each number is preset to correspond to a musical note. For example, "7" is corresponding to "do", "8" is corresponding to "mi", "5" is corresponding to "fa", "9" is corresponding to "la", then, the first audio information "do mi do fa la mi fa" is generated based on musical notes corresponding to the unlock code "7875985".

In at least one embodiment, the first processor 12 can include a central processing unit (CPU), a microprocessor, or other data processing chip that can perform various functions of the key 1.

The power supply 13 can be a rechargeable battery and to provide power to the first port 10, the first storage device 11, and the first processor 12.

In at least one embodiment, the key 1 can be connected to the electronic device 2 via the first port 10, or through a network, for example, a local wireless network (LWN). The key 1 can unlock the electronic device 2 by sending the first audio information to the electronic device 2 when a display screen 20 is locked.

Figure 2:
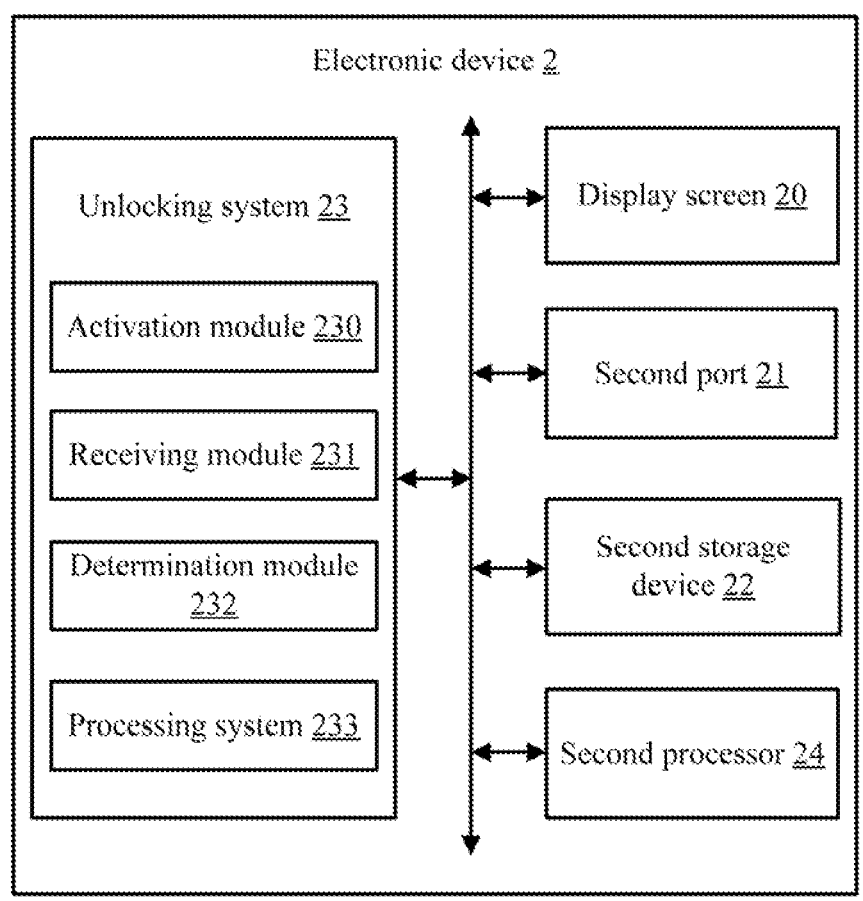
FIG. 2 is a block diagram of an example embodiment of an electronic device including an unlocking system.

FIG. 2 is a block diagram of an example embodiment of the electronic device. The electronic device 2 can be a smart phone, a personal digital assistant (PDA), a tablet computer, or other electronic device. The electronic device 2 can include, but is not limited to, a display screen 20, a second port 21, a second storage device 22, an unlocking system 23, and at least one second processor 24. FIG. 2 illustrates only one example of the electronic device 2, other examples can include more or fewer components than illustrated, or have a different configuration of the various components in other embodiments.

In at least one embodiment, the display screen 20 can output visible data. The second port 21 may be a COM port, or a USB port, and can be connected to the first port 10 of the key 1, to enable communications between the key 1 and the electronic device 2. In at least one embodiment, the electronic device 2 can also include a wireless communication module (not shown), such as a BLUETOOTH module, a Wi-Fi module, which provide functions of wireless data communication with the key 1.

In at least one embodiment, the second storage device 22 can include various types of non-transitory computer-readable storage mediums. For example, the second storage device 22 can be an internal storage system, such as a flash memory, a random access memory (RAM) for temporary storage of information, and/or a read-only memory (ROM) for permanent storage of information. The second storage device 22 can also be an external storage system, such as a hard disk, a storage card, or a data storage medium. The at least one second processor 24 can be a central processing unit (CPU), a microprocessor, or other data processor chip that performs functions of the electronic device 2. In addition, the second storage device 22 pre-stores a second decryption algorithm. In one embodiment, the second decryption algorithm is the same as the first decryption algorithm stored in the first storage device 11 of the key 1.

The unlocking system 23 can receive the first audio information from the key 1 after an unlocked icon of the display screen 20 of the electronic device 2 is pressed, and compare second audio information generated by the electronic device 2 with the first audio information. The display screen 20 of the electronic device 2 is unlocked when the second audio information is the same as the first audio information.

In at least one embodiment, the unlocking system 23 can include an activation module 230, a receiving module 231, a determination module 232, and a processing module 233. The function modules 230, 231, 232, and 233 can include computerized codes in the form of one or more programs which are stored in the second storage device 22. The at least one second processor 24 executes the computerized codes to provide functions of the function modules 230-233 as described below.

The activation module 230 activates the display screen 20 of the electronic device 2 which is locked when receiving a communication signal from the key 1, and generates an unlocked icon on the display screen 20. In at least one embodiment, when the electronic device 2 is in a sleep mode, the display screen 20 of the electronic device 2 can lock automatically for protecting data security of the electronic device 2. When the key 1 and the electronic device 2 are connected to each other, the communication signal is generated. The activation module 230 can activate the display screen 20 after receiving the communication signal from the key 1, and generate the unlocked icon on the display screen 20. In at least one embodiment, the electronic device 2 is connected to the key 1 via the first port 10, or through a network, for example, a local wireless network (LWN).

The activation module 230 further sends a request to the key 1 for generating a first unlock code in response to the unlocked icon being pressed. In at least one embodiment, the first unlock code is generated by the first processor 12 randomly according to the first decryption algorithm stored in the first storage device 11 of the key 1. In one embodiment, the first processor 12 of the key 1 can generate the first unlock code by randomly selecting one or more elements in the matrix of the first decryption algorithm. For example, as shown in FIG. 3, the first processor 12 can randomly select three elements "A3" "D8" and "F4" in the matrix. Element "A3" includes a number 78, element "D8" includes a number 75, and element "F4" includes a number 985, thus, an unlock code "7875985" can be generated.

The receiving module 231 receives first audio information of the first unlock code from the key 1. In at least one embodiment, each number can be preset to correspond to a musical note, and the first processor 12 of the key 1 converts the first unlock code to the first audio information according to the corresponding musical notes. For example, "7" is corresponding to "do', "8" is corresponding to "mi", "5" is corresponding to "fa", "9" is corresponding to "la", then, the first unlock code 7875985 can be transferred to the first audio information "do mi do fa la mi fa".

In one embodiment, the receiving module 231 provides a setting interface for the user to set a complexity of the unlock code. The more elements in the matrix of the first decryption algorithm being selected, the more secure the unlock code will be.

The determination module 232 determines whether the first audio information is the same as second audio information generated by the second decryption algorithm stored in the second storage device 22 of the electronic device 2. In at least one embodiment, the second decryption algorithm is the same as the first decryption algorithm.

When the first audio information is the same as the second audio information, the processing module 233 unlocks the display screen 20 of the electronic device 2.

When the first audio information is different from the second audio information, the processing module 233 further determines whether a current number of times of attempting to unlock the display screen 20 is equal to or greater than a predetermined number of times. In some embodiments, the processing module 233 further provides a setting interface for the user to set the predetermined number of times. In one example, the predetermined number of times can be 3.

When the current number of times is equal to or greater than the predetermined number of times, the processing module 233 activates an alarm of the electronic device 2, for example, a loud beeping of the electronic device 2 is generated. When the current number of times is less than the predetermined number of times, the receiving module 231 receives first audio information of the unlock code from the key 1.

Figure 4:
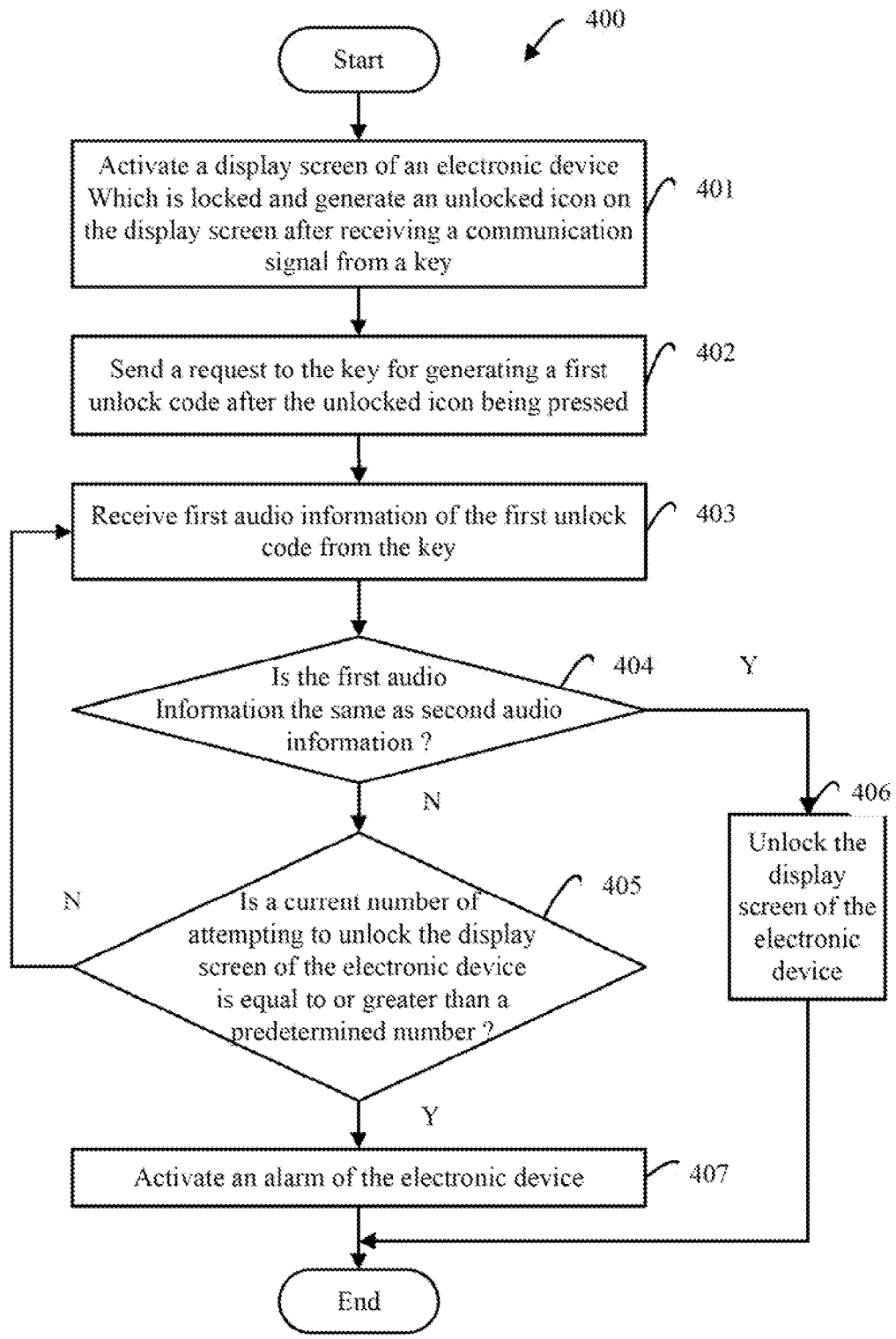
FIG. 4 is a flowchart of an example embodiment of a method of unlocking an electronic device using the key of FIG. 1.

FIG. 4 is a flowchart of an example embodiment of a method of unlocking an electronic device using the key. An example method 400 is provided by way of example, as there are a variety of ways to carry out the method. The example method 400 described below can be carried out using the configurations illustrated in FIG. 1 and FIG. 2, and various elements of these figures are referenced in explaining the example method. Each block shown in FIG. 4 represents one or more processes, methods, or subroutines, carried out in the example method 400. Furthermore, the illustrated order of blocks is illustrative only and the order of the blocks can be changed according to the present disclosure. The example method 400 can begin at block 401. Depending on the embodiment, additional blocks can be utilized and the ordering of the blocks can be changed.

At block 401, an activation module activates the display screen 20 of the electronic device 2 which is locked when receiving a communication signal from the key 1, and generates an unlocked icon on the display screen 20. In at least one embodiment, when the electronic device 2 is in a sleep mode, the display screen 20 of the electronic device 2 can lock automatically for protecting data security of the electronic device 2. When the key 1 and the electronic device 2 are connected to each other, the communication signal is generated. The activation module activates the display screen 20, and generates the unlocked icon on the display screen 20, after receiving the communication signal from the key 1. In at least one embodiment, the electronic device 2 is connected to the key 1 via the first port 10, or through a network, for example, a local wireless network (LWN).

At block 402, the activation module further sends a request to the key 1 for generating a first unlock code in response to the unlocked icon being pressed. In at least one embodiment, the first unlock code is generated by the first processor 12 randomly according to the first decryption algorithm stored in the first storage device 11 of the key 1. In one embodiment, the first processor 12 of the key 1 generates the first unlock code by randomly selecting one or more elements in the matrix of the first decryption algorithm.

At block 403, a receiving module can receive first audio information of the first unlock code from the key 1. In at least one embodiment, each number can be preset to correspond to a musical note, and the first processor 12 of the key 1 transfers the first unlock code to the first audio information according to the corresponding musical notes. In one embodiment, the receiving module can provide a setting interface for the user to set a complexity of the unlock code. The more elements in the matrix of the first decryption algorithm selected, the more secure the unlock code will be.

At block 404, a determination module determines whether the first audio information is the same as second audio information generated by the second decryption algorithm stored in the second storage device 11 of the electronic device 2. In at least one embodiment, the second decryption algorithm is the same as the first decryption algorithm. When the first audio information is different from the second audio information, the procedure goes to block 405. When the first audio information is the same as the second audio information, the procedure goes to block 406.

When the first audio information is different from the second audio information, at block 405, the determination module further determines whether a current number of times of attempting to unlock the display screen 20 is equal to or greater than a predetermined number of times. In some embodiments, the processing module further provides a setting interface for the user to set the predetermined number of times. When the current number of times is equal to or greater than the predetermined number, the procedure goes to block 407, when the current number of times is less than the predetermined number, the procedure returns to block 403.

When the first audio information is the same as the second audio information, at block 406, a processing module unlocks the display screen 20 of the electronic device 2.

When the current number of times is equal to or greater than the predetermined number, at block 407, the processing module activates an alarm of the electronic device 2, for example, a loud beeping of the electronic device 2 is generated.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprises:
   at least one processor; and
   a storage device that stores one or more programs which, when executed by the at least one processor, cause the at least one processor to:
   activate a display screen of the electronic device which is locked when receiving a communication signal from a key, and generate an unlocked icon on the display screen;
   send a request to the key for generating an unlock code after the unlocked icon being pressed;
   receive first audio information of the unlock code from the key;
   determine whether the first audio information is the same as second audio information generated by the electronic device; and
   unlock the display screen of the electronic device when the first audio information is the same as the second audio information;
   wherein the first audio information is generated by:
   presetting a matrix of the decryption algorithm, each element of the matrix comprising a random number, and presetting a relationship between musical notes and numbers;
   generating an unlock code by randomly selecting one or more elements in the matrix; and
   converting the unlock code to the first audio information according to the relationship between musical notes and numbers in the unlock code.

2. The electronic device according to claim 1, wherein the at least one processor further:
   provides a setting interface for the user to set a complexity of the unlock code.

3. A computer-implemented method for unlocking a display screen of an electronic device using a key, being executed by at least one processor of the electronic device, the method comprising:
   activating a display screen of the electronic device which is locked when receiving a communication signal from a key, and generating an unlocked icon on the display screen;

sending a request to the key for generating first audio information after the unlocked icon being clicked;

receiving the first audio information of an unlock code from the key;

determining whether the first audio information is the same as second audio information generated by a decryption algorithm stored in the storage device of the electronic device; and unlocking the display screen of the electronic device when the first audio information is the same as the second audio information;

wherein the first audio information is generated by:

presetting a matrix of the decryption algorithm, each element of the matrix comprising a random number, and presetting a relationship between musical notes and numbers;

generating an unlock code by randomly selecting one or more elements in the matrix; and converting the unlock code to the first audio information according to the relationship between musical notes and numbers in the unlock code.

4. The method according to claim 3, further comprising:

providing a setting interface for the user to set a complexity of the unlock code.

* * * * *